United States Patent

[11] 3,626,475

| [72] | Inventor | David J. Hicks |
| | | Tulsa, Okla. |
| [21] | Appl. No. | 673 |
| [22] | Filed | Jan. 5, 1970 |
| [45] | Patented | Dec. 7, 1971 |
| [73] | Assignee | T. D. Williamson Inc. |
| | | Tulsa, Okla. |

[54] HIGH TEMPERATURE PIPE-PLUGGING APPARATUS
14 Claims, 14 Drawing Figs.

| [52] | U.S. Cl. | 138/94 |
| [51] | Int. Cl. | F16l 55/10 |
| [50] | Field of Search | 138/89, 94; |
| | | 251/306; 137/15; 251/334; 220/24 A |

[56] References Cited
UNITED STATES PATENTS

| 1,831,905 | 11/1931 | Cox | 138/89 |
| 3,025,885 | 3/1962 | Ver Nooy | 138/94 |
| 3,154,106 | 10/1964 | Ver Nooy | 138/94 |

FOREIGN PATENTS

| 491,828 | 9/1938 | Great Britain | 138/89 |

*Primary Examiner*—Alan Cohan
*Attorney*—Hyer, Eickenroht, Thompson & Turner

ABSTRACT: The high temperature pipe plugger disclosed uses a backup plate for the sealing element on the plugging member that provides substantially complete support for the sealing element against the differential pressure imposed on the element by the hot fluid in the pipe. The backup plate may either deform the pipe to match its outside diameter or the pipe may deform the plate to match its inside diameter depending on the material from which the plate is made and the shape of the pipe. A method of isolating a leak in a superheated steam line is also disclosed. The method locates the pipe plugs far enough away from the bypass openings for the steam adjacent the plug, being removed from the flowing stream, to lose its superheat quickly and thereby reduce the temperature at which the sealing element of the plugging member must operate while the line is being repaired.

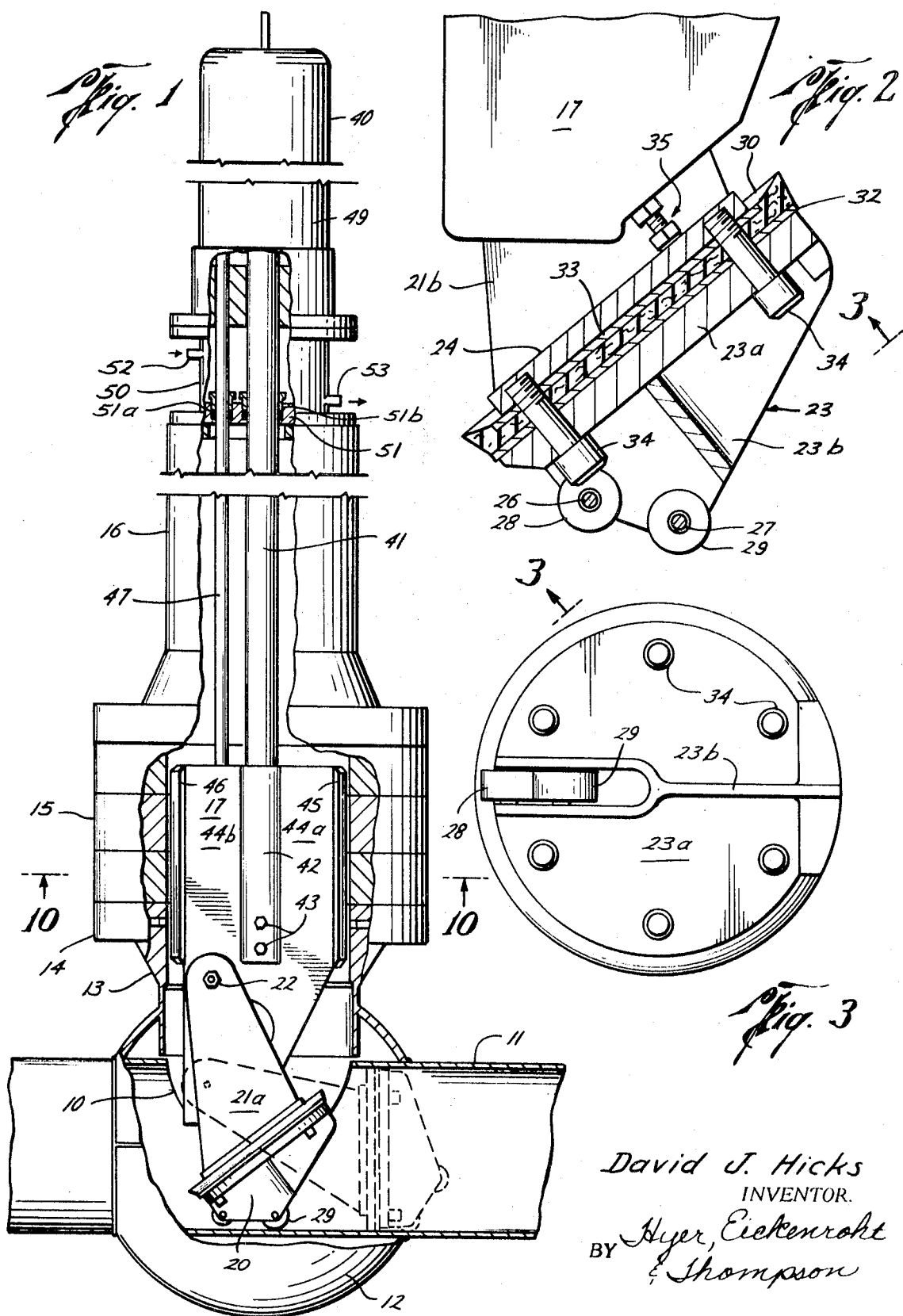

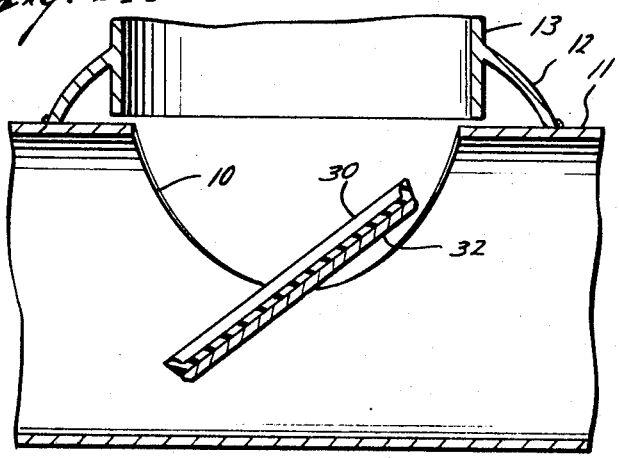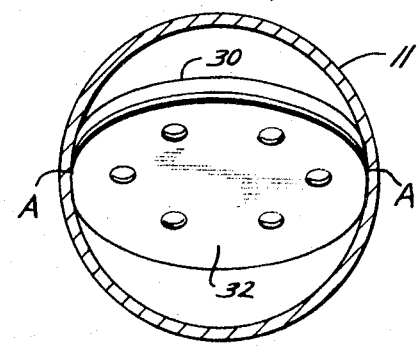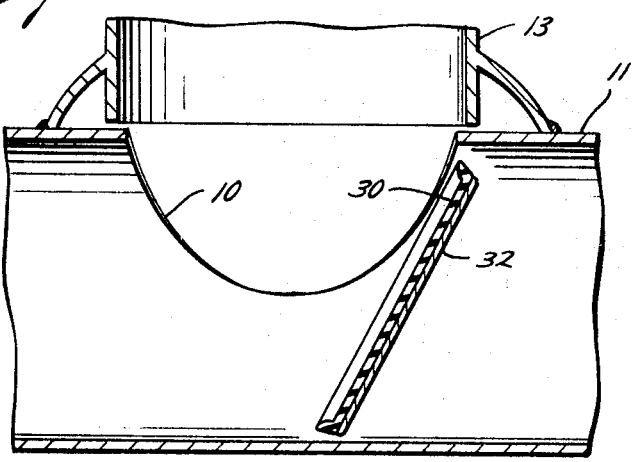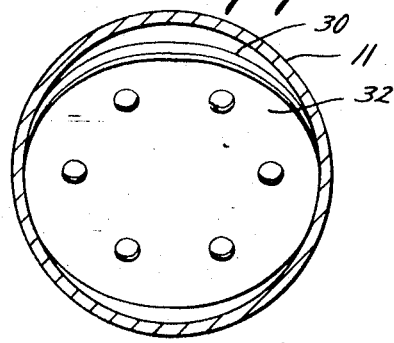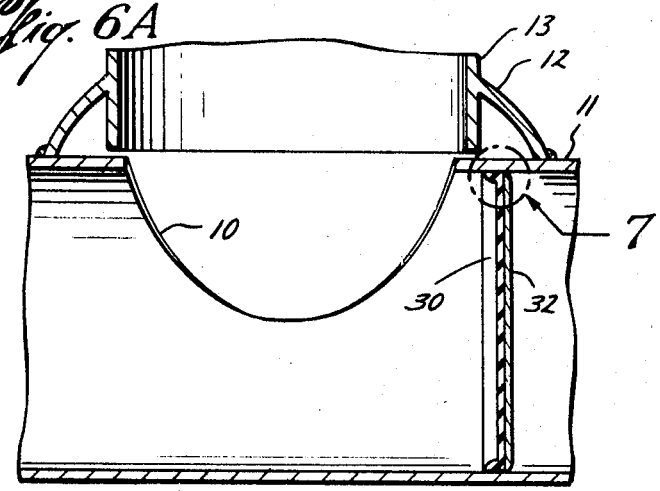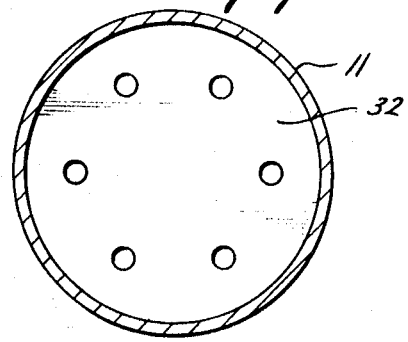

David J. Hicks
INVENTOR.

BY Hyer, Eickenroht
& Thompson
ATTORNEYS

David J. Hicks
INVENTOR.

BY Hyer, Eickenroht
& Thompson
ATTORNEYS 3,626,475

HIGH TEMPERATURE PIPE-PLUGGING APPARATUS

This invention relates generally to pipe pluggers of the type having a plugging member insertable into a pipe through a lateral opening therein. In particular, this invention relates to pluggers of this type for use in plugging pipelines carrying hot fluids and to a method that is particularly advantageous when plugging pipelines carrying superheated steam.

Pipe pluggers of the type to which this invention relates are used to temporarily plug a pipeline so repairs or additional connections or both can be made in the line. Usually, they are used with temporary bypass lines so the pipeline does not have to be taken out of service. Even such temporary plugging operations usually last for a matter of hours since repairs to a pipeline require time, particularly, where the line carries a hot fluid under pressure, such as steam. At elevated temperatures, the material of the sealing element tends to soften with time. As it softens, it will lose its ability to resist being extruded through the space between the plugging member and the inner wall of the pipe by the pressure it is holding.

It is an object of this invention to provide improved plugging apparatus for temporarily plugging pipelines carrying hot fluids.

It is another object of this invention to provide such plugging apparatus for pipelines carrying hot fluids wherein the sealing element of the plugging member of the apparatus is supported over substantially its entire area by a rigid backup plate to thereby substantially eliminate any space into which the material of the sealing element can flow even though it is substantially softened by the temperature of the fluid in the line.

It is another object of this invention to provide such plugging apparatus for lines carrying hot fluids that employs a backup plate for the sealing element on the plugging member that has a diameter substantially equal to the diameter of the nominal diameter of the pipe to thereby insure that the sealing element on the plugging member is supported substantially completely by the backup plate of the plug member.

It is another object of this invention to provide such plugging apparatus wherein the backup plate is substantially equal to the nominal diameter of the pipe and is made of a material that will deform, as required, to conform to the inner contour of the pipe and provide substantially 100 percent backup to the sealing element on the plugging member.

It is another object of this invention to provide such apparatus with a backup plate on the plugging member that is substantially equal to or greater than the nominal diameter of the pipe and which is sufficiently strong to deform the pipe and cause it to conform to the diameter of the backup plate thereby again providing complete backup to the sealing element on the plugging member.

It is another object of this invention to provide a unique method of plugging a line carrying superheated steam wherein the plugging member is spaced from the bypass connections far enough for the superheated steam adjacent the plugging member to be remote enough from the steam flowing in the line that it will quickly lose its superheat, thereby reducing the temperature at the plug to that of saturated steam at the line pressure. This reduces quickly the temperature to which the sealing element on the plug member is subjected during the plugging operation, thereby allowing it to seal for a much longer period of time.

These and other objects, advantages, and features of this invention will be apparent to those skilled in the art from a consideration of this specification, including the attached drawings and appended claims.

The invention will now be described in detail in connection with the attached drawings in which:

FIG. 1 is a side view, partly in section and partly in elevation, of the preferred embodiment of the plugging apparatus of this invention, the plugging member thereof being shown just as it contacts the pipe after it has passed through the lateral opening therein and in dashed lines in the position it takes when in pipe-plugging position;

FIG. 2 is a cross-sectional view, on an enlarged scale, of the plugging member of FIG. 1;

FIG. 3 is a view of the plugging member of FIG. 2 taken along line 3—3;

Figure 7:
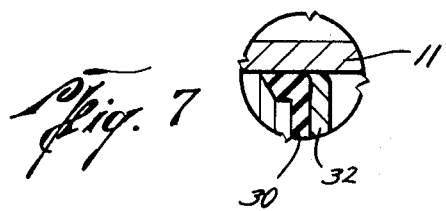
Figure 8:
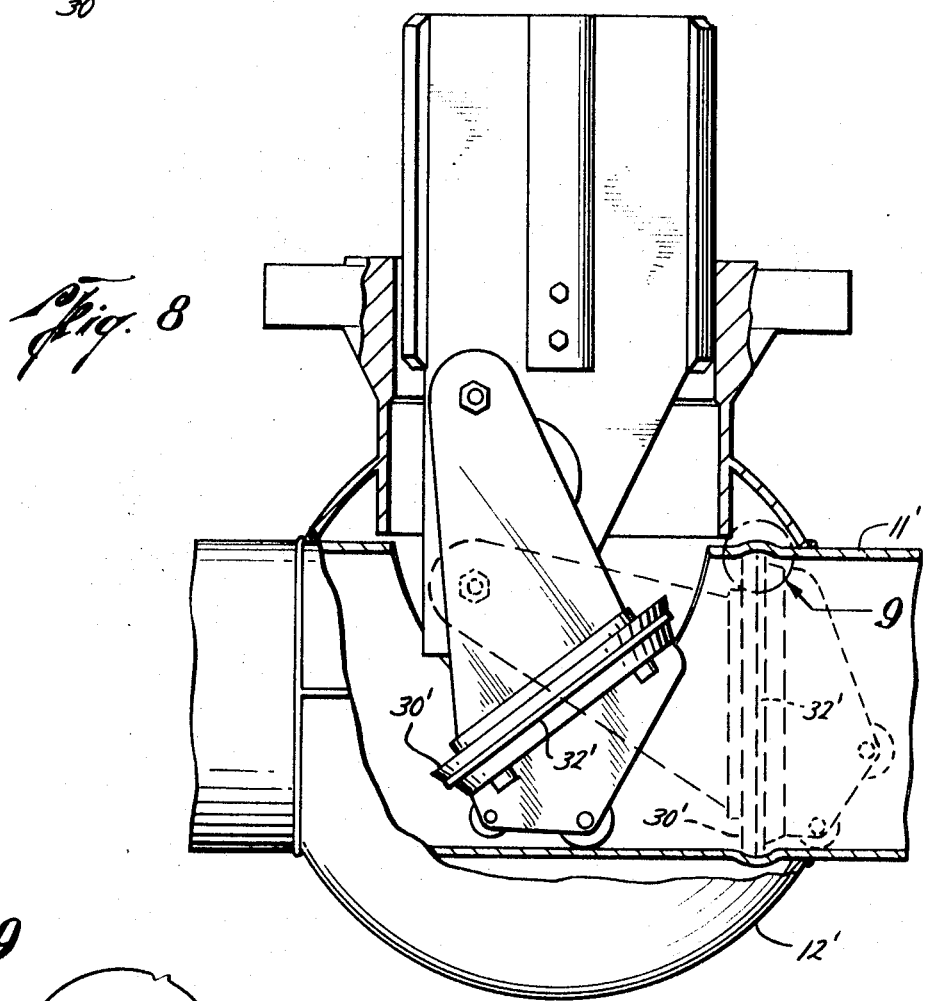
Figure 9:
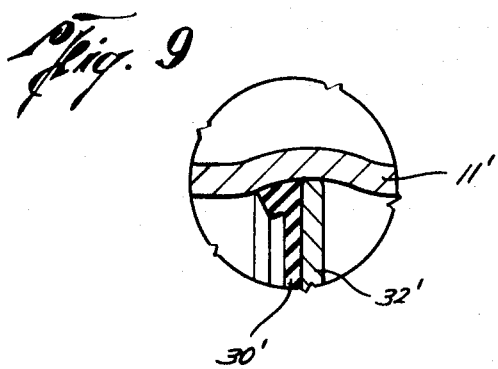
Figure 10:
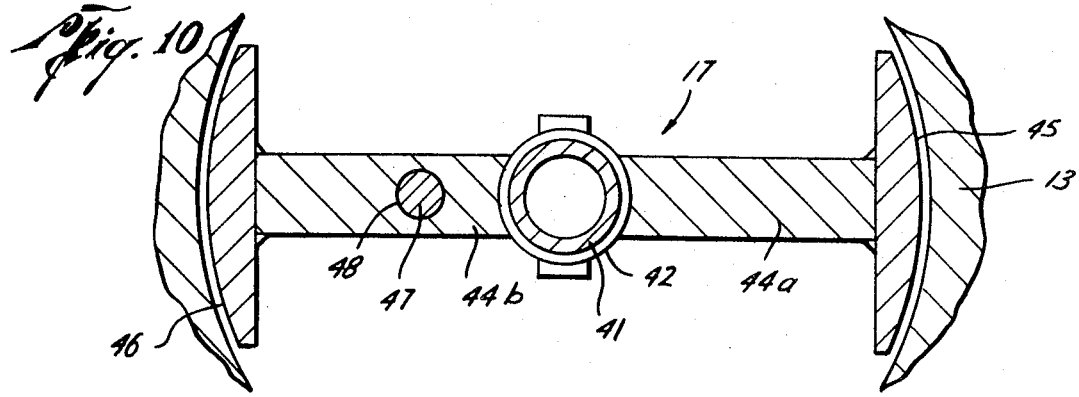

FIGS. 4A—6A and 4B—6B are side views and front views, respectively, of one embodiment of the sealing element and backup plate of this invention in three different positions in the pipe;

FIG. 7 is an enlarged view of a portion of the sealing element and backup plate of FIG. 6A;

FIG. 8 is a side view, partially in section and partially in elevation, of the lower portion of the apparatus of this invention showing another embodiment of the plugging member in the same position as in FIG. 1;

FIG. 9 is a view on an enlarged scale of the portion of FIG. 8 enclosed in the circle 9 showing the backup plate and sealing element of this embodiment of the plugging member in sealing engagement with the pipe;

FIG. 10 is a cross-sectional view taken along line 10—10 of FIG. 1; and

Figure 11:
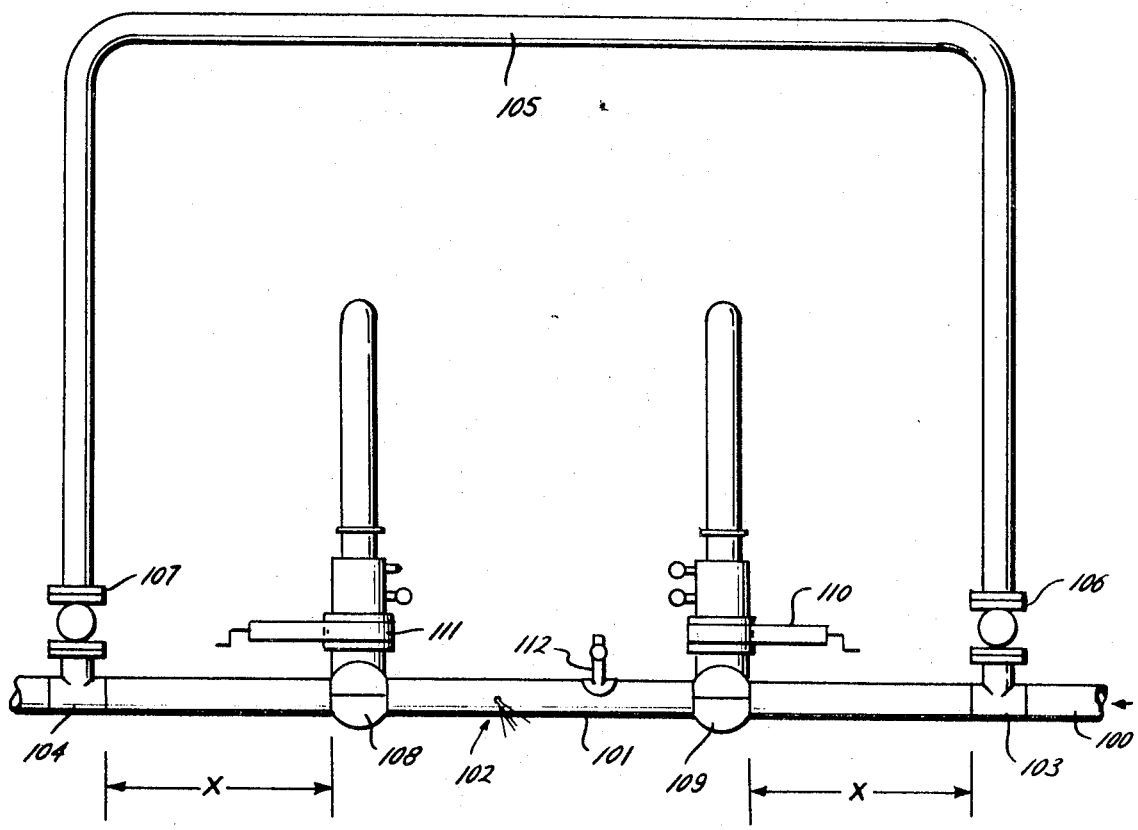

FIG. 11 is a schematic drawing of a pipeline equipped with pluggers to illustrate the method of this invention.

Before a pipe can be plugged with the apparatus of this invention, a lateral opening must be cut in the side of the pipe. In FIG. 1, lateral opening 10 has been cut in the side of pipe 11, preparatory to the plugging operation. This lateral opening is cut in the line by conventional "hot tapping" apparatus. The first step in this operation is to attach a fitting to the line that will form part of the pressuretight housing around the lateral opening. In the embodiment shown in FIG. 1, split spherical tee 12 is attached to line 11 for this purpose. The tee includes two halves that are fitted around the pipe and bolted or welded thereto. The tee includes branch 13 that is equipped with flange 14 upon which can be mounted valve 15. The operating portion of the valve, the stem, etc., are not shown in the drawing for simplicity. The tapping apparatus is mounted on valve 15 and opening 10 is cut in the pipe. The valve is then closed to allow the tapping apparatus to be replaced by the plugging apparatus.

As stated above, the plugging apparatus includes a pressure tight housing for enclosing the lateral opening in the pipe. As shown, this housing includes tee 12, valve 15, and plugging member housing 16. Plugging member carrier 17 is located in the housing. Plugging member 20 is attached to carrier 17 by arms 21a and 21b. One end of each arm is rigidly attached to the plug member. The other end of each arm is pivotally connected to carrier 17 by bolt 22. Thus, arms 21a and 21b connect the plugging member to the carrier so that the plugging member will move laterally into pipe-plugging position (the position shown in dashed lines in FIG. 1) as the carrier moves toward pipe 11. The arms, in turn, will move the plugging member out of pipe-plugging position and upwardly through the lateral opening in the pipe, as the carrier moves away from the pipe.

As shown in FIGS. 2 and 3, plug member 20 includes nosepiece 23 and mounting plate 24. The nosepiece includes disc portion 23a and forwardly extending flange portion 23b. This flange portion is bifurcated at its lower end to support shafts 26 and 27, which in turn support rollers 28 and 29. These rollers support the plugging member during the initial portion of its movement from the position shown in FIG. 1 to the pipe-plugging position, as the carrier moves downwardly toward the pipe.

Clamped between mounting plate 24 and disc portion 23a of the nosepiece are sealing element 30 and backup plate 32. Sealing element 30 is cup shaped, generally, to provide a pressure energized lip seal against the inner surface of the pipe. Preferably, it has a diameter such that there will be interference between the outside surface of the lip portion and the pipe, when it is installed in pipe-plugging position. Positioned inside the circular cavity of the cup-shaped seal is support plate 33. This plate helps to confine the seal element, when it is subjected to differential pressure at an elevated temperature. Cap screws 34 hold the assembly together. Adjustable stop 35 limits the distance the plugging member can pivot downwardly around mounting bolt 22, so that roller 29 will be in position to move the plugging member laterally to the right, as viewed in FIG. 1, when the carrier moves the plugging member into engagement with the pipe.

Means are provided to move the carrier toward and away from the to move the plugging member into and out of pipe-plugging position. The means also forces the backup plate to conform to the inside surface of the pipe or forces the pipe to conform to the inside surface of the backup plate as required, in accordance with this invention, as will be explained more fully below. The carrier moving means includes hydraulic cylinder 40, in which is located a piston (not shown) and force-transmitting means. By introducing fluid under pressure on either side of the piston, as desired, the piston will move up or down relative to the cylinder in the conventional manner. Force-transmitting means, comprising piston rod 41 in the embodiment shown, are connected between the piston and carrier 17. As shown in FIG. 10, the carrier includes central tubular member 41 into which piston rod 41 extends. Bolts 43 extend through the central tubular section of the carrier and the piston rod to connect the two together. Extending laterally from each side of central tubular section 42 are guide plates 44a and 44b, which support bearing members 45 and 46, respectively. The outer surfaces of these bearing members are turned to approximately the same curvature as the inside surface of branch 13 of tee 12. The bearing members transmit the lateral force imposed on the carrier by the plugging member to the tee and supports the carrier as it slides along the inner surface of the tee branch.

To insure that carrier 17 is properly oriented with respect to the pipe and that it maintains its orientation, guide rod 47 is connected to the piston in hydraulic cylinder 40 and also to carrier 17. In the embodiment shown, the rod extends into tapped hole 48 in member 48b. The piston rod and the guide rod both extend through openings in cylinder head 49. Therefore, by properly aligning the cylinder with the pipeline, the carrier and the plugging member will be properly oriented with respect to the pipe.

Since this pipe-plugging apparatus is to be used to plug pipelines carrying hot fluids, it is preferable to shield hydraulic cylinder 40 with its many seals from the heat of this fluid, as much as possible. For this purpose, in the embodiment shown, cooling spool 50 is positioned between cylinder 40 and plug housing 16. The cooling spool has flanges on either end to be connected to the plugging member housing and cylinder 40 in the conventional manner. Cylinder heat 49 provides a seal for the cooling spool at one end. At the other end, end plate 51 closes the spool and also maintains housing section 16 sealed. Rods 41 and 47 extend through stuffing boxes 51a and 51b in plate 51 and cylinder head 49.

The cooling spool then forms a cooling jacket around the rods and by circulating a cooling liquid, such as water into inlet 52 and out outlet 53, cylinder assembly 40 and its related components above the cooling spool can be protected from the heat of the fluid in the line being plugged.

Referring now to the embodiment of the invention shown in FIGS. 4A–7, backup plate 32 and sealing element 30 are shown as they travel into and out of plugging position in pipe 11. Backup plate 32 is of a diameter substantially equal to the nominal diameter of pipe 11. By nominal diameter, it is meant the diameter that the pipe is supposed to have in accordance with the mill specifications. The idea is to have backup plate 32 completely span the opening in the pipe so as to provide 100 percent backup support to sealing element 30. The pipe is usually not round, however, and it is usually not exactly up to mill specifications as far as inside diameter is concerned. Therefore, it will be assumed that backup plate 32 may be slightly larger in diameter than the pipe or the pipe will be out of round and in one direction there will be clearance and in the other there will not. In any event, in accordance with this invention, backup plate 32, in the embodiment shown in FIGS. 4A–6B, is made of a material that will deform as required to conform to the inner contour of the pipe.

Referring to the drawings, as the backup plate first enters the pipe through the lateral opening 10, the edge surfaces marked A will contact the inside of the pipe first. There probably will be some deformation of the backup plate at this point. Very little force will be required here to cause the deformation necessary for the backup plate and seal member to move from the position shown in FIGS. 4A and 4B to the position shown in FIGS. 5A and 5B. Here the backup plate and seal element are about halfway toward pipe-plugging position. At this point more of the edge surface of the backup plate is in contact with the inside surface of the pipe. The force required to move the backup plate has increased. When the backup plate and seal member reach pipe-plugging position, as shown in FIGS. 6A and 6B, substantially the entire outer edge surface of the backup plate will be in contact with the inside surface of the pipe, assuming the pipe was not badly out of round and its diameter was within tolerances. Since the backup plate is made of a material not as strong as the pipe, that is, one that will yield rather than cause the pipe to yield, it will be conformed substantially to the inside contour of the pipe. There may be cases, of course, where the pipe is badly out of round, where the backup plate will cause the pipe to do some conforming on its own, i.e., cause it to become more round, but it is intended in this particular embodiment for the backup plate to do the yielding. In FIG. 7, there is a view on an enlarged scale of the backup plate and seal member in pipe-plugging position. The backup plate was sheared, or upset adjacent its outer edge, laterally to the left, as viewed in this figure, as it was forced to wipe the inside surface of the pipe during its move into pipe-plugging position.

One such material that has been used for this purpose successfully is aluminum. The sealing element used with the aluminum backup plate was machined glass-filled Teflon. Aluminum was found to be soft enough to deform readily and conform to the inside surface of the pipe and yet it will provide adequate backup for the sealing element to support it long enough, when subjected to superheated steam at 650° F. and 500 p.s.i., for the temperature of the steam to drop to that of saturated steam at the pressure of the line.

Referring now to FIGS. 8 and 9, an alternate embodiment of this invention is shown. In this embodiment backup plate 32' is made of a material that has a strength above that of the pipe in which it is to be located and has an outside diameter substantially equal to or greater than the nominal inside diameter of the pipe. In this case, the backup plate will deform the pipe and force the pipe to conform to the outside contour of the backup plate. This is shown in FIG. 9, where backup plate 32' has caused the wall of pipe 11' to bulge outwardly in order to accommodate the backup plate. Usually, the pipe is deformed completely around its circumference in which case, the backup plate provides 100 percent backup to sealing element 30. It is understood that there may be some yielding of the backup plate also. For example, the leading edges may be rounded as the plate moves into pipe-plugging position. The same is true of the first-described embodiment, where the inside of the pipe may lose some metal as the backup plate moves into position. The major deformation, however, will occur in the backup plate in the first embodiment and in the pipe in the latter.

It would not be wise, of course, to deform pipe that is subjected to high temperatures and high-pressure service, since this requires the pipe to be stressed beyond its yield point, which could weaken it. For this reason, preferably, the location of the plugging member in pipe-plugging position is such that it bulges the pipe within the pressuretight housing of the apparatus. Thus, the portion of the pipe that is stressed beyond its yield strength will not be subjected to any pressure differential thereafter. In other words, as shown in FIG. 8, spherical tee 12 encloses the portion of the pipe that is deformed. This fitting is permanently installed on the pipe. Therefore, there will be no pressure differential existing across the deformed section of the line thereafter.

There will be a considerable amount of force required to deform the pipe of the backup plate, as the case may be. Therefore, it is an important feature of this invention that a large mechanical advantage is obtained through the manner in which the plugging member is connected to the carrier. For as the carrier moves toward the pipe and the plugging member moves laterally to its pipe-plugging position, the lateral component of the force provided by the hydraulic cylinder increases and reaches a maximum, when the plugging member reaches its pipe-plugging position. This is important for the force required to move the plugging member laterally also increases as the plugging member approaches its pipe-plugging position. A large amount of force is also required to remove the plugging member, but it is usually less than that required to place it in position initially.

Referring now to FIG. 11, a unique method of using the apparatus of this invention to plug a superheated steam line will be described. The equipment in the drawing is shown more or less schematically. Steam line 100 has a section 101 that must be repaired or replaced. For example, it may have developed leak 102. If it is desired to repair this leak without shutting down the equipment being serviced by the line, then the leaking section must be bypassed. This is usually the procedure desired particularly where the line is in a process plant or a power generating plant where it is time consuming and expensive to take a steam line out of service. The first step then in repairing the line is to complete bypass connections 103 and 104. These bypass connections are made with a hot tapping machine that cuts a lateral hole in the line through a pressuretight housing. Bypass 105 is then connected between valves 106 and 107.

The next step is to cut lateral openings in the line inside the pressuretight housings 108 and 109 using hot tapping equipment. Pipe-plugging equipment, such as shown in FIG. 1, is then mounted on valves 110 and 111 preparatory to plugging off leaking section 101 of the line. The first step, preferably, is to position an orifice plate in the line through downstream valve 111. The orifice plate slows down the flow of steam through the main line by restricting its flow so that most of the steam will be diverted to the bypass line. This makes it easier to set the pipe-plugging member through upstream fitting 109. When this is done, the orifice plate can be removed and the downstream plugging member placed on the pipe through housing 108. This will isolate section 101 from the steam flowing through the line.

It is one of the features of this invention that fittings 108 and 109 are positioned a substantial distance away from bypass fittings 103 and 104. For it has been found that by doing so the steam adjacent the pipe-plugging members will quickly lose its superheat and become saturated steam at the pressure of the line. For example, in one test this method was used to isolate a section of line carrying superheated steam at 600° F. at 500 p.s.i. When the steam adjacent the plugging members was stopped from moving, its temperature dropped quickly to 470° F. which is approximately the temperature of saturated steam at this pressure. This reduced considerably the temperature to which the sealing elements on the plugging members were subjected during most of the repairing operation, although the bypass continued to carry steam at 600° F. With section 101 isolated by the pipe plugs, the section can be removed and a new section placed in the line. The new section should be provided with valve 112 so that when repairs have been completed, the new section can be pressured up to line pressure to reduce the pressure differential across the plugs to zero. This allows the plugs to be more easily removed from the line.

From the foregoing description of one embodiment of this invention, by way of example, it will be seen that this invention is one well adapted to attain all of the ends and objects hereinabove set forth, together with other advantages which are obvious and which are inherent to the apparatus and structure.

The invention having been described, what is claimed is:

1. A pipe plugger for temporarily plugging a pipe containing hot fluids by inserting a plug member into the pipe through a side opening, said plugger comprising, a fluidtight housing for mounting on a pipe to enclose an opening in the side of the pipe, a carrier located in the housing, a plugging member including a sealing element for forming a seal between the plugging member and the pipe and a backup plate having an outside diameter such that the pipe is deformed when the plate is positioned transverse the pipe, said plate being made of a material having sufficient strength to deform the pipe as required for the plate to move to a position transverse the pipe to support the sealing element against a differential pressure existing thereacross, means attached to the plugging member and pivotally connected to the carrier to move the plugging member through the side opening and into a pipe-plugging position laterally of the opening when the carrier is moved toward the pipe and out of pipe-plugging position and out of the pipe through the opening when the carrier is moved away from the pipe, and means for so moving the carrier and for exerting sufficient force thereon to move the backup plate into position transverse the pipe and deform the pipe as required for the pipe to conform to the outside diameter of the backup plate.

2. The pipe plugger of claim 1 in which the fluidtight housing includes a portion that is permanently attached to the pipe and that encloses the outside surface of the pipe opposite the position of the plugging member when in pipe-plugging position whereby the portion of the pipe that is deformed is located within said housing and has the same pressure existing outside thereof as exists inside the pipe.

3. The plugger of claim 1 in which the sealing element is cup shaped and is held in sealing engagement with the pipe by the pressure differential existing across the element.

4. The plugger of claim 1 in which the carrier moving means includes a power section and a force-transmitting member and the plugger is further provided with a cooling section positioned between the power section and the housing, through which the force-transmitting member extends, said cooling section having an inlet and an outlet between which a cooling fluid can be circulated through the spool to keep the spool and the power means below the temperature of the fluid in the pipe.

5. A pipe plugger for temporarily plugging a pipe containing hot fluids by inserting a plug member into the pipe through a side opening, said plugger comprising, a fluidtight housing for mounting on a pipe to enclose an opening in the side of the pipe, a carrier located in the housing, a plugging member including a sealing element and a backup plate having an outside diameter such that the plate cannot be inserted into the pipe without deforming the plate, said plate being made of a material that has sufficient strength to support the sealing element when subjected to the expected differential pressure and temperature but which will yield as required to conform to the inside diameter of the pipe, an arm attached to the plugging member and pivotally connected to the carrier to move the plugging member through the side opening and into a pipe-plugging position laterally of the opening when the carrier is moved toward the pipe and out of pipe-plugging position and out of the pipe through the opening when the carrier is moved away from the pipe, and means for so moving the carrier and for exerting sufficient force thereon to move the backup plate into position transverse the pipe and deform the backup plate as required for the backup plate to conform to the inside shape of the pipe.

6. The plugger of claim 5 in which the sealing element is cup shaped and is held in sealing engagement with the pipe by the pressure differential existing across the element.

7. The plugger of claim 5 in which the carrier moving means includes a power section and a force-transmitting member and the plugger is further provided with a cooling section position between the power section and the housing, through which the force-transmitting member extends, said cooling section having an inlet and an outlet between which a cooling fluid can be circulated through the spool to keep the spool and the power means below the temperature of the fluid in the pipe.

8. The pipe plugger of claim 5 in which the backup plate is made of aluminum.

9. The pipe plugger of claim 5 in which the sealing element is made of glass-filled Teflon.

10. A plugging member for temporarily plugging a pipe carrying hot fluids by insertion into the pipe through a side opening, said plugging member comprising a sealing element for forming a seal between the plugging member and the pipe and a backup plate having an outside diameter such that the pipe is deformed when the plate is positioned transverse the pipe, said plate being made of a material having sufficient strength to deform the pipe as required for the plate to move to a position transverse the pipe to support the sealing element against a differential pressure existing thereacross.

11. A plugging member for temporarily plugging a pipe carrying hot fluids by insertion into the pipe through a side opening, said plugging member comprising a sealing element and a backup plate having an outside diameter such that the plate cannot be inserted into the pipe without deforming the plate, said plate being made of a material that has sufficient strength to support the sealing element when subjected to the expected differential pressure and temperature, but which will yield as required to conform to the inside diameter of the pipe.

12. The pipe plugger of claim 10 in which the backup plate is made of aluminum.

13. The pipe plugger of claim 12 in which the sealing element is made of glass-filled Teflon.

14. A pipe plugger for temporarily plugging a pipe containing hot fluids by inserting a plug member into the pipe through a side opening, said plugger comprising, a fluidtight housing for mounting on a pipe to enclose an opening in the side of the pipe, a carrier located in the housing, a plugging member including a sealing element for forming a seal between the plugging member and the pipe, and a backup plate having an outside diameter such that one of the plate and the pipe are deformed when the plate is positioned transverse the pipe to support the sealing element against a differential pressure existing thereacross, means attached to the plugging member and pivotally connected to the carrier to move the plugging member through the side opening and into a pipe-plugging position laterally of the opening when the carrier is moved toward the pipe and out of pipe-plugging position and out of the pipe through the opening when the carrier is moved away from the pipe, and means for so moving the carrier and for exerting sufficient force thereon to move the backup plate into position transverse the pipe.

* * * * *